Jan. 17, 1961     T. J. MESH     2,968,753
ELECTRONIC LEVEL SENSING SERVOSYSTEM
Filed March 17, 1958     3 Sheets-Sheet 1

*INVENTOR.*
THEODORE J. MESH
BY
Chapin + Neal
Attorneys

INVENTOR.
THEODORE J. MESH
BY
Chapin + Neal
Attorneys

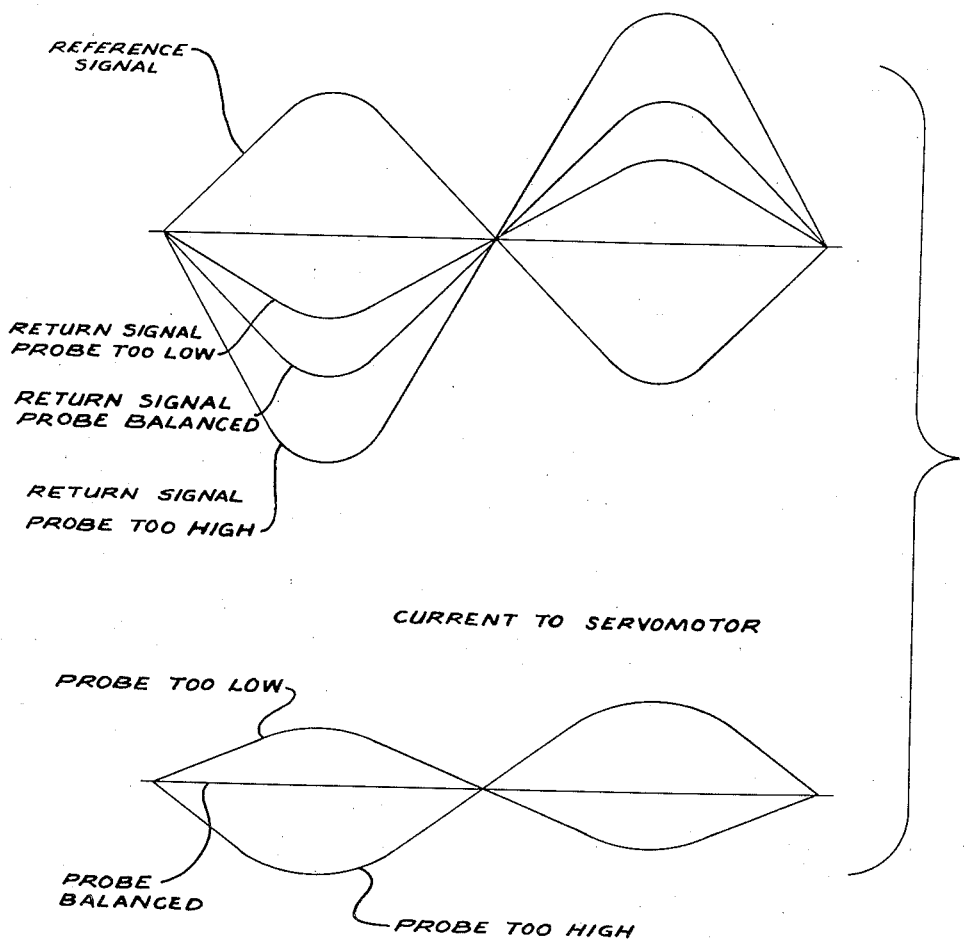

… …

United States Patent Office 2,968,753
Patented Jan. 17, 1961

2,968,753

ELECTRONIC LEVEL SENSING SERVOSYSTEM

Theodore J. Mesh, Easthampton, Mass., assignor to Gilbert & Barker Manufacturing Company, West Springfield, Mass., a corporation of Massachusetts Filed Mar. 17, 1958, Ser. No. 722,002

7 Claims. (Cl. 318—31)

The present invention relates to improvements in electronic liquid sensing apparatus.

Such sensing apparatus as is exemplified in U.S. Patents 2,682,026 and 2,812,928 provides many advantages, particularly in accuracy, over prior devices for this purpose. However, installation costs which are incurred in handling certain components thereof have prevented use of the apparatus in certain cases because of the economic factors involved.

An overall object of the invention is to provide an improved apparatus including a novel electrical circuit which enables a drastic reduction in the size and weight of these components, thus reducing the cost of their installation.

Another object of the invention is to simplify and reduce the cost of the elements comprising the electrical circuit of such sensing apparatus.

The above and other related objects, as well as the novel means by which they are attained will be apparent from a reading of the following description of the disclosure found in the accompanying drawings and the novelty thereof pointed out in the appended claims.

In the drawings:

Fig. 4 is a plot illustrating voltage and current relationships in the operation of the present device.

Figure 1:
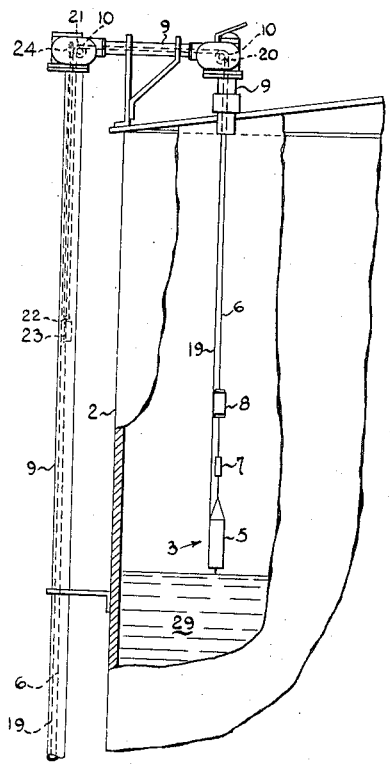
Fig. 1 is a small scale fragmentary elevational view, partly in section, of an oil storage tank equipped with an electronic level sensing apparatus.
Figure 1:
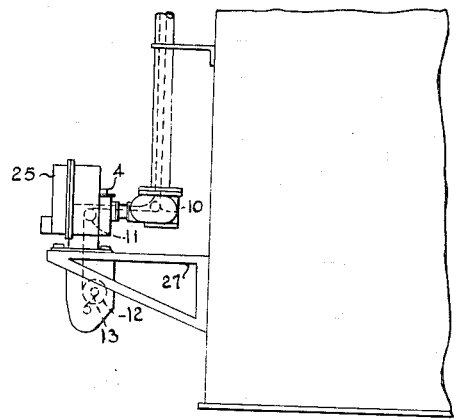

Referring to Fig. 1, a cylindrical sensing element 3 is suspended vertically in a liquid storage tank 2. The sensing element comprises a tubular metallic shield 5 open at its lower end and having a probe or tuned wire 1 mounted within said shield with the lower end of the probe 1 extending beyond the lower end of the shield and adapted to be in predetermined contactual relationship with liquid 29 in the tank. A more detailed description of the sensing element and its operation will be given in the description of Figs. 2 and 3.

A coaxial cable 19 and a perforated tape 6 are attached to the upper end of the sensing element 3. As shown in Fig. 1, the cable 19 electrically connects the sensing element 3 to an electronic control unit 25 located on a bracket 27 adjacent the base of the tank 2. The tape 6 mechanically connects the sensing element 3 to a two-phase induction servo-motor 4, also located on bracket 27.

The tape 6 extends upwardly from the sensing element 3 to an insulating link 7 and a weight 8 and then to a composite conduit housing 9 which extends outwardly from the top of tank 2 and downwardly to the control unit 25 at its base. The insulating link 7 serves to electrically isolate the sensing element 3 from the tape 6. The tape 6 extends along the conduit 9 and is guided for axial movement therein by means of a series of idler rollers 10 to a sprocket wheel at the control unit 25. The wheel 11 is driven by the motor 4 so that rotation of the wheel causes movement of the tape 6 as projections on the wheel engage the perforations in the tape to thus raise or lower element 3 in the tank. The lower end of tape 6 is wound on a drum 12 which is yieldably restrained by a balancing spring 13.

The coaxial cable 19 extends upwardly from the sensing element 3 as shown in Fig. 1 into the conduit housing 9, around an idler roller 20 and then horizontally outwardly to an idler roller 21, downwardly to a vertically movable sheave 22 and then upwardly and is clamped to the housing as indicated at 24. From the clamp 24 the cable 19 passes downwardly in the tube 9 and then outwardly into the electronic control unit 25. The length of cable 19 passing around the sheave 22 provides a take-up loop accommodating movement of the sensing element 3 from the top to the bottom of the tank 2 as the sensing element 3 is moved to follow the level of the liquid in the tank. A weight 23 is attached to sheave 22 to maintain a slight tension on the take-up loop in cable 19 so that it will not become entangled when the sensing element is raised by the tape 6.

The overall unit thus far described is generally similar to what is shown in the above-mentioned patents to the extent that in each a sensing element, as the element 3, is electrically and mechanically connected to control means, as the unit 25, mounted at the base of a tank. And, as will soon appear, electronic means are provided for maintaining the sensing element in predetermined contactual relationship with the liquid in the tank. This involves the transmission of a high frequency signal from the control unit to the sensing element and the transmission of a return signal (indicative of the depth of the probe in the liquid) to the servo-motor which will automatically restore the desired predetermined relationship with the liquid as the level of the liquid may vary. The improved means, including novel electronic circuitry, for transmitting these two signals and the novel benefits resulting therefrom will now be described in detail.

Figure 2:
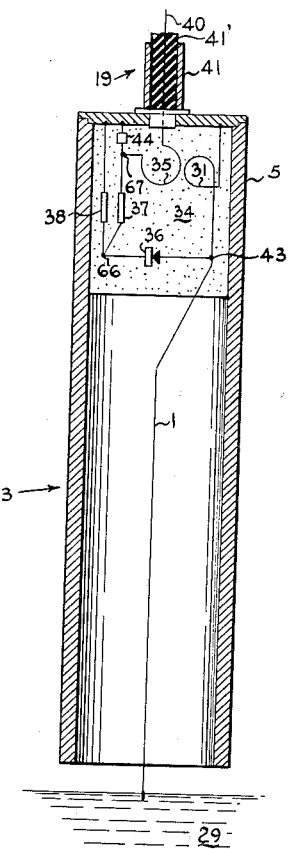
Fig. 2 is a sectional elevational view drawn to a larger scale of a level sensing element seen in Fig. 1.

The sensing element 3 comprises various electrical components which may be physically arranged in the manner seen in Fig. 2 and will later be described in detail. The coaxial cable 19 at the upper end of the shield 5 comprises a single inner conductor 40 spaced from a conducting shield 41 by a dielectric tube 41' which may advantageously be formed of polytetrafluoroethylene. The shield 41 is attached to and electrically connected with the upper face of the metallic shield 5 of the sensing element. The inner conductor 40 extends interiorly of shield 5 and is incorporated in an electric circuit best understood from the following description of the diagrammatical showing in Fig. 3 of the various circuit elements also disposed within the shield 5. These elements may be held in place and protected from moisture and abuse by resin indicated at 34 cast into the upper part of the interior of the shield 5.

Figure 3:
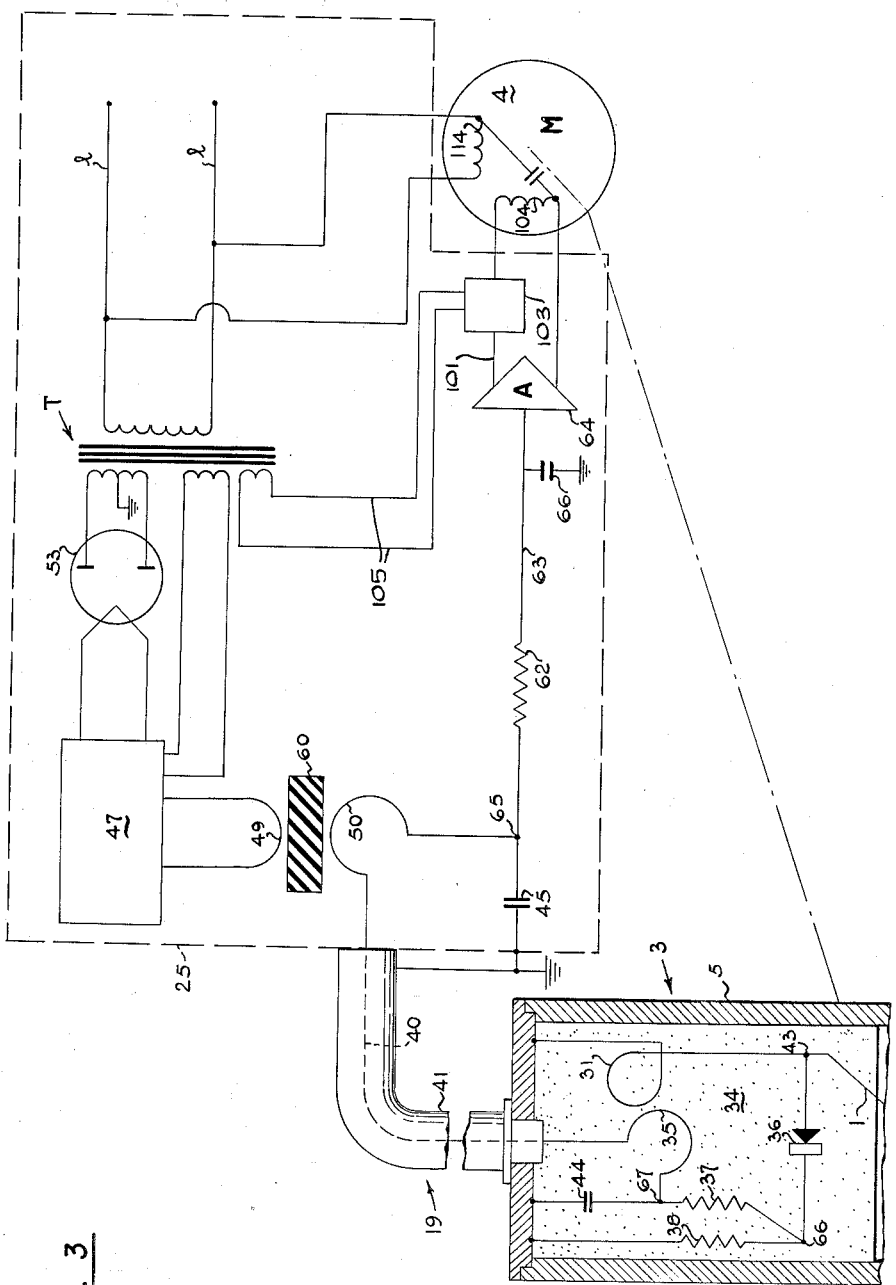
Fig. 3 is a schematic wiring diagram illustrative of the electrical connections between an electronic control unit and the sensing element.

Fig. 3 is a wiring diagram showing the electrical connections from the sensing element 3 to the electronic control unit 25 and also from the sensing element 3 to the servo-motor 4.

In the electronic control unit 25, alternating current from a suitable source, say at 115 volts and 60 cycles is connected across the primary of a transformer T through lines l. One secondary of transformer T is coupled to a full wave rectifier 53 to power an oscillator 47. The oscillator 47 may be any conventional type to develop a relatively high frequency signal, suitably 160 megacycles. This high frequency signal is applied to an output loop 49 of the oscillator 47 and is modulated by the 160 cycle signal provided by another secondary of the transformer T also being applied to the loop 49. A loop 50 is loosely coupled with loop 49 and an insulating spacer 60 is placed between the loops to insure proper spacing. The high frequency modulated signal is induced in loop 50 which is formed in one end of the inner conductor 40 of coaxial cable 19. This modulated signal is fed along the inner conductor 40 to another loop 35 formed in its other end interiorly of the sensing element 3. The circuit for this modulated signal is completed from the loop 35 through a condenser 44 to the shield 5, then through the coaxial shield 41 to ground at the control unit 25. The other side of the circuit for the modulated signal is completed from the loop 50 through condenser 45 also to ground at the control unit 25. The condensers 44, 45 have a relatively low impedance to the high frequency of this modulated signal and therefore permit the circuit to be completed in the manner described.

Interiorly of the element 3, a coil 31 is connected at one end to the grounded shield 5 and at its other end to probe wire 1 and inductively coupled to the high frequency modulating signal on loop 35 to thus impress it on probe 1. Probe 1 is of a length such that in combination with the shield 5 it is resonant or tuned at the high frequency of the modulated signal, i.e. 160 megacycles. The probe 1 thus acts in a manner similar to a series resonant circuit and since a larger current flows at resonance in such a circuit it can be seen that the actual voltage developed on the probe may be many times greater than the voltage of the modulated signal picked up by coil 31 because it is tuned for resonance at the frequency of the modulated signal. A second modulated signal is developed on the probe 1 having a maximum amplitude when probe 1 is out of contact with the liquid. This second signal diminishes in amplitude as the probe 1 is immersed in the liquid to thereby change its effective electrical length or impedance and cause it to be detuned.

A rectifier or detector 36 which may be of the crystal diode type, such as a silicon diode, is connected on one side to probe 1 at junction 43. The detector 36 is connected on its other side to a load resistor 38. The detector 36 passes the relatively low frequency modulating component, 60 cycles, of the signal developed on the probe 1. This component, or return signal, has a characteristic indicative of changes in the contactual relationship of the probe 1 and the liquid 29. That is to say, this component has an amplitude equal to the amplitude of the second signal developed by the probe which in turn is dependent on the depth of immersion of the probe 1 in the liquid. This component or return signal creates a varying voltage across load resistor 38, illustratively having an impedance of ten thousand ohms. This component or return signal is transmitted from a junction 66 through a coupling or blocking resistor 37 and loop 35 to inner conductor 40 of cable 19; the impedance of condenser 44 preventing this return signal from being shorted to the grounded shield 5 because of the low frequency of this signal. From conductor 40 the return signal is transmitted to a junction 65 between loop 50 and wire 63. The condenser 45 also presents a high impedance to this low frequency return signal thereby preventing it from being shorted to the grounded control unit 25. From junction 65 the component is transmitted through a protective or blocking resistor 62 to a conventional power amplifier 64. The amplified return signal is then fed by way of wire 101 to electrical means (indicated at 103) for comparing it to a reference signal derived from a further secondary of the transformer t and fed to the comparing means by wires 105. The reference signal is constant in amplitude and 180° out of phase with the return signal. The resultant of the return and control signals is fed with or without further amplification from the comparing means 103 to one field winding 104 of the motor 4.

It will be noted that protective resistor 62 has a high impedance to the high frequency signal as compared to condenser 45 so that it will be blocked from the amplifier 64. Similarly, resistor 37 in the sensing element 3 has a high impedance to the high frequency signal as compared to condenser 44 so that it will be blocked from the detector 36 and the probe 1.

In addition to field winding 104, servomotor 4 has a field winding 114 connected across the alternating current supply lines *l*. When the probe 1 is in its abovementioned predetermined relationship with liquid 29, the amplitude of the component or return signal equals the amplitude of the reference signal and consequently there will be no resultant from the comparing means 103. In this condition, no current will be impressed on the winding 104 and consequently, there will be no rotation of motor 4 since current is applied only to the winding 114. This is the balanced condition of the system. When the amplitude of the return signal passed by detector 36 changes as a result of a change in the level of liquid 29, the amplitude of the signal fed through wire 101 to the comparing means will be greater or less than the fixed strength of the reference signal, thus causing a resultant signal of proper phase to be fed to winding 104. Motor 4 is then driven in the proper direction to reposition probe 1 to its predetermined relationship with the liquid (as shown in Figs. 1 and 2) whereupon the return signal will again equal the reference signal and rotation of motor 4 will stop.

Fig. 4 illustrates the above relationships of the reference signal and return signal at the comparing means. The return signal is always 180° out of phase with the reference signal. When the probe is in the desired relation relative to the liquid surface the amplitude of the return signal equals that of the reference signal and consequently there will be no resultant current (plotted therebeneath) for driving the servomotor 104. When the probe is too high relative to the liquid surface the return signal is greater than the reference signal and there is a resultant current for driving the servomotor to lower the probe. When the probe is too low the reference signal is greater than the return signal and there is a resultant current of opposite polarity for driving the servomotor to raise the probe.

The values of the various components are of importance insofar as their relationship in obtaining the above function is concerned. The following values have been found effective, however, it is to be understood that these values are purely illustrative. Condensers 44 and 45 each have a capacitance of 500 mmf. At the relatively high frequency of the modulated signal generated in loop 49 and transmitted to loop 35, these condensers have a low impedance of about 2 ohms, whereby these condensers complete the circuit for this signal back to ground. Resistors 37 and 62 have much higher impedances 10,000 and 50,000 ohms respectively to the high frequency signal and effectively block the high frequency signal from the detector 36 and power amplifier 64. The condenser 44 has an impedance of 5 megohms to the low frequency of the return signal thus preventing it from being shorted to the shield 5. The condenser 45 has the same impedance of 5 megohms to the return signal thus preventing it from being shorted to ground at the point where the high frequency circuit is shorted to ground.

While certain benefits of this invention are to be gained primarily where a mechanical connection is provided to the sensing element, the component or return signal could be used to control any means for restoring or maintaining the predetermined relationship of the sensing element and liquid. The component could be used, for example, to control a pump designed to keep the liquid level in the tank constant with respect to the probe by replacing or removing liquid as necessary.

The present sensing apparatus wherein the described means for incorporating the single conductor 40 into both the high frequency modulated signal circuit and the return signal circuit provides many economies over prior apparatus. Thus for example the housing 9 and particularly its vertical portion may be drastically reduced in cross section so that a crew of workmen may install the apparatus without the need of power assists which would involve considerable expense, as for example, a crane capable of working to a height of 60 feet or more. One of the principal factors is that the cable 19 may be bent around a relatively short radius without any harmful physical or electrical effects, thus the various pulleys around which it is trained and particularly the sheave 22 (Fig. 1) in the take-up loop of the cable 19 may be relatively small. Therefore, not only may the vertical section of the housing 9 be reduced in size and cost, but also all other components of the housing as well as the pulleys themselves may be so reduced. Further, it will be noted that this improved combination benefits from the inclusion of a single wire cable by reason of the fact that it is concentrically formed and thus its capacitance may be readily maintained uniform by conventional manufacturing techniques. For this reason, the signals and particularly the return signal will be transmitted with a high efficiency from conventionally produced cable.

Having thus described the invention what is claimed as novel and desired to be secured by Letters Patent of the United States is:

1. Electronic liquid level sensing apparatus comprising a sensing element normally having a predetermined relationship with liquid in a container, means for maintaining the said relationship of the sensing element and the liquid, means for generating a signal, means for transmitting said signal from said generating means to the sensing element, said transmitting means including a single wire conductor and a shield coaxial therewith, said sensing element having means for developing a return signal in response to said signal, said return signal having a characteristic indicative of changes in the predetermined relationship of the element with the liquid, and means for transmitting said return signal along said single conductor to provide a transmission path from said sensing element to the maintaining means, said maintaining means being responsive to the said characteristic of the return signal to automatically and continuously maintain the predetermined relationship of the sensing element and the liquid regardless of any changes in the level of the liquid in the container.

2. Electronic liquid level sensing apparatus comprising a sensing element normally having a predetermined contactual relationship with liquid in a storage tank, means for automatically restoring the said relationship of the sensing element and the liquid, means for generating a first signal, means for transmitting said first signal from the generating means to the sensing element, said transmitting means including a single wire conductor and a shield coaxial therewith, said sensing element comprising means for developing in response to said first signal a second signal having a characteristic indicative of the extent of contact of said element with said liquid and means for detecting a return signal from said second signal, said return signal having the characteristic of said second signal, impedance means for establishing a path for transmitting said return signal along said single conductor to the restoring means, said restoring means being responsive to the said characteristic of the return signal to automatically re-establish the predetermined relationship of the sensing element and the liquid whenever said relationship changes.

3. Electronic level sensing apparatus comprising a sensing element normally having a predetermined contactual relationship with liquid in a storage tank, a control unit located outside said tank and comprising means for restoring said relationship and a signal generator producing a first modulated signal of relatively high frequency, a coaxial cable comprising a single length of inner conductor wire coupled at one end with said signal generator and at its other end with said sensing element, said cable having a coaxial shield providing an outer conductor concentrically surrounding said wire throughout its length from the sensing element to the control unit and electrically connecting said element and said unit, impedance means electrically interconnecting said coaxial shield and the ends of said inner conductor wire and passing said first signal to provide a first circuit over said cable, said sensing element having means for developing from the first signal a second modulated signal having an amplitude proportional to the extent of contact of said element with the liquid, said sensing element also having a detector connected with said second signal developing means passing a return signal which is a relatively low frequency component of said second signal, means connecting said detector to said other end of said inner conductor and means connecting said one end of said inner conductor to said restoring means, the said impedance means blocking said return signal from said shield to establish a second circuit over said cable from said sensing element to said control unit for said return signal, said restoring means being operative in response to amplitude changes of said return signal to reestablish said predetermined relationship of the sensing element with the liquid whenever the level of the liquid in the tank changes.

4. Electronic level sensing apparatus comprising a sensing element normally having a predetermined contactual relationship with liquid in a storage tank, a control unit located outside said tank and comprising means for restoring said relationship and a signal generator producing a first modulated signal of relatively high frequency, a coaxial cable comprising a single length of inner conductor wire and a coaxial shield providing an outer conductor concentrically surrounding said wire, said control unit being housed in a grounded casing and said sensing element comprising a metal shell, said coaxial shield being connected to said casing and said shell to ground the latter element, said inner conductor wire having a first loop formed in one end thereof and inductively coupled with the signal generator and a second loop formed in its other end within said sensing element, impedance means comprising a condenser connected between said first loop and ground, and a second condenser connected between said second loop and the metal shell of said sensing element, said condensers having relatively low impedances to the high frequency of said first signal thereby passing said signal from said inner conductor to ground to complete the circuit therefor, said sensing element having means for developing a second modulated signal from said second loop, said second signal having an amplitude proportional to the extent of contact of said element with said liquid, said sensing element also having a detector connected with said second signal developing means and passing a return signal which is a relatively low frequency component of said second signal, means connecting said detector to said other end of said conductor within said sensing element and means connecting said one end of said inner conductor to said restoring means, the impedance means blocking said signal from said shield and from ground to establish a second circuit over said cable from said sensing element to said control unit for said return signal, said restoring means being operative in response to amplitude changes of said return signal to reestablish said predetermined relationship of the sensing element with the liquid whenever the level of the liquid in the tank changes.

5. Electronic level sensing apparatus comprising a sensing element normally having a predetermined contactual relationship with liquid in a storage tank, a control unit located outside said tank and comprising means for restoring said relationship and a signal generator producing a first modulated signal of relatively high frequency, a coaxial cable comprising a single length of inner conductor wire coupled at one end with said signal generator and at its other end with said sensing element, said cable having a coaxial shield providing an outer conductor concentrically surrounding said wire throughout its length from the sensing element to the control unit and electrically connecting said element and said unit, impedance means electrically interconnecting said coaxial shield and the ends of said inner conductor wire and passing said first signal to provide a first circuit over said cable, said sensing element having means for developing from the first signal a second modulated signal having an amplitude proportional to the extent of contact of said element with the liquid, said sensing element also having a detector connected with said second signal developing means and passing a return signal which is a relatively low frequency component of said second signal, means connecting said detector to said other end of said inner conductor, means connecting said one end of said inner conductor to said restoring means, the said impedance means blocking said return signal from said coaxial shield to establish a second circuit over said cable from the sensing element to said control unit for said return signal, said restoring means being operative in response to amplitude changes in said return signal to reestablish said predetermined relationship of the sensing element with the liquid whenever the level of the liquid in the tank changes, protective impedance means incorporated in the means connecting said detector to said other end of said inner conductor and protective impedance means incorporated in the means connecting said one end of said inner conductor to said restoring means, said protective impedance means having relatively less impedance than the impedance of said first named impedance means to said low frequency signal and said protective impedance means having relatively greater impedance to said high frequency signal than said first named impedance means, whereby said last named impedance means passes the low frequency return signal and blocks the high frequency first signal from the detector and the restoring means.

6. Electronic liquid level sensing apparatus comprising a sensing element having a conductive body and normally having a predetermined contactual relationship with liquid in a storage tank, a control unit disposed at the base of said tank and comprising means for restoring said relationship and a signal generator producing a first modulated signal of a relatively high frequency, said restoring means comprising a servo-motor and a mechanical connection with said sensing element, said servo-motor being operative to raise and lower said sensing element as the level of the liquid changes, a coaxial cable comprising a single length of inner conductor wire and a coaxial shield providing an outer conductor concentrically surrounding said wire substantially throughout its length, said coaxial shield being fixed to and electrically connected to the control unit, said cable extending upwardly of said tank and having a take-up loop formed therein and then extending into said tank for connection with said sensing element, the coaxial shield thereof being electrically connected to the body of the sensing element and the inner conductor wire of said cable extending into said control unit and being coupled at one end with said signal generator and at its other end with said sensing element, impedance means electrically interconnecting said coaxial shield and each end of said inner conductor wire and passing said first signal to provide a first circuit over said cable, said sensing element having means for developing from the first signal a second modulated signal having an amplitude proportional to the extent of contact of said element with the liquid, said sensing element also having a detector connected with said second signal developing means and passing a return signal which is a relatively low frequency component of said second signal, means connecting said detector to said other end of said inner conductor and means connecting said one end of said inner conductor to said restoring means, the said impedance means blocking said return signal from said shield to establish a second circuit over said cable from said sensing element to said control unit for said return signal, said restoring means being operative in response to amplitude changes of said return signal to rotate said servo motor in a proper direction to bring said sensing element into said predetermined relationship with said liquid whenever the level of the liquid in the tank changes.

7. Electronic level sensing apparatus comprising a sensing element having a conductive outer shell and normally having a predetermined contactual relationship with liquid in a storage tank, a control unit disposed at the base of the tank and comprising a grounded casing housing means for restoring said relationship and a signal generator producing a first modulated signal of a relatively high frequency, said restoring means comprising a servo-motor and a mechanical connection with said sensing element, said servo-motor being operative to raise and lower said sensing element as the level of the liquid changes, a coaxial cable comprising a single length of inner conductor wire and a coaxial shield providing an outer conductor concentrically surrounding said wire substantially throughout its length, said coaxial shield being fixed to and electrically connected to the control unit, said cable extending upwardly of said tank and having a take-up loop formed therein and then extending into said tank for connection with said sensing element, the coaxial shield thereof being connected to the shell of the sensing element and the inner conductor wire of said cable extending into said control unit and having a first loop formed therein which is inductively coupled with said signal generator, the other end of said inner conductor extending interiorly of said sensing element and having a second loop formed therein, first and second condensers respectively connected between the first loop and the coaxial shield through the casing of the control unit and the second loop and the coaxial shield through the shell of the sensing element, said condensers having relatively low impedances to the high frequency of said first modulated signal thereby passing said signal from said inner conductor to said coaxial shield to complete the circuit therefor, a tuned wire disposed within said sensing element shell and extending beyond its lower end, a pick-up loop connected between said tuned wire and the shell of said sensing element and inductively coupled with the second loop in said inner conductor, said tuned wire being resonant at the frequency of the first modulated signal to develop a second modulated signal which is variable in accordance with the extent of contact of said wire with said liquid, a detector connected on one side between said wire and its associated loop for passing the low frequency modulating component of said second signal, a load resistor connected between the other side of said detector and the shell of said sensing element to develop a return signal, a blocking resistor connected between said other side of said detector and said inner conductor to provide a path for the return signal back to the control unit, and an electrical connection between the inner conductor and the restoring means for completing a path for the return signal to the restoring means, a blocking resistor incorporated in the connection between the inner conductor and the restoring means, the impedance of said condensers being sufficiently great with respect to the low frequency of the return signal to prevent the return signal from being shorted to ground and the impedance of the resistors being sufficiently great with respect to the impedance of the condensers to the high frequency signal to prevent the high frequency signal from passing to either the detector or the restoring means, said restoring means being operative in response to the return signal to rotate said servo-motor in a proper direction to bring said sensing element into said predetermined relationship with said liquid whenever the level of the liquid in the tank changes.

References Cited in the file of this patent

UNITED STATES PATENTS

| | | |
|---|---|---|
| 2,379,689 | Crosby | July 3, 1945 |
| 2,812,928 | Mesh et al. | Nov. 12, 1957 |